Patented Oct. 30, 1934

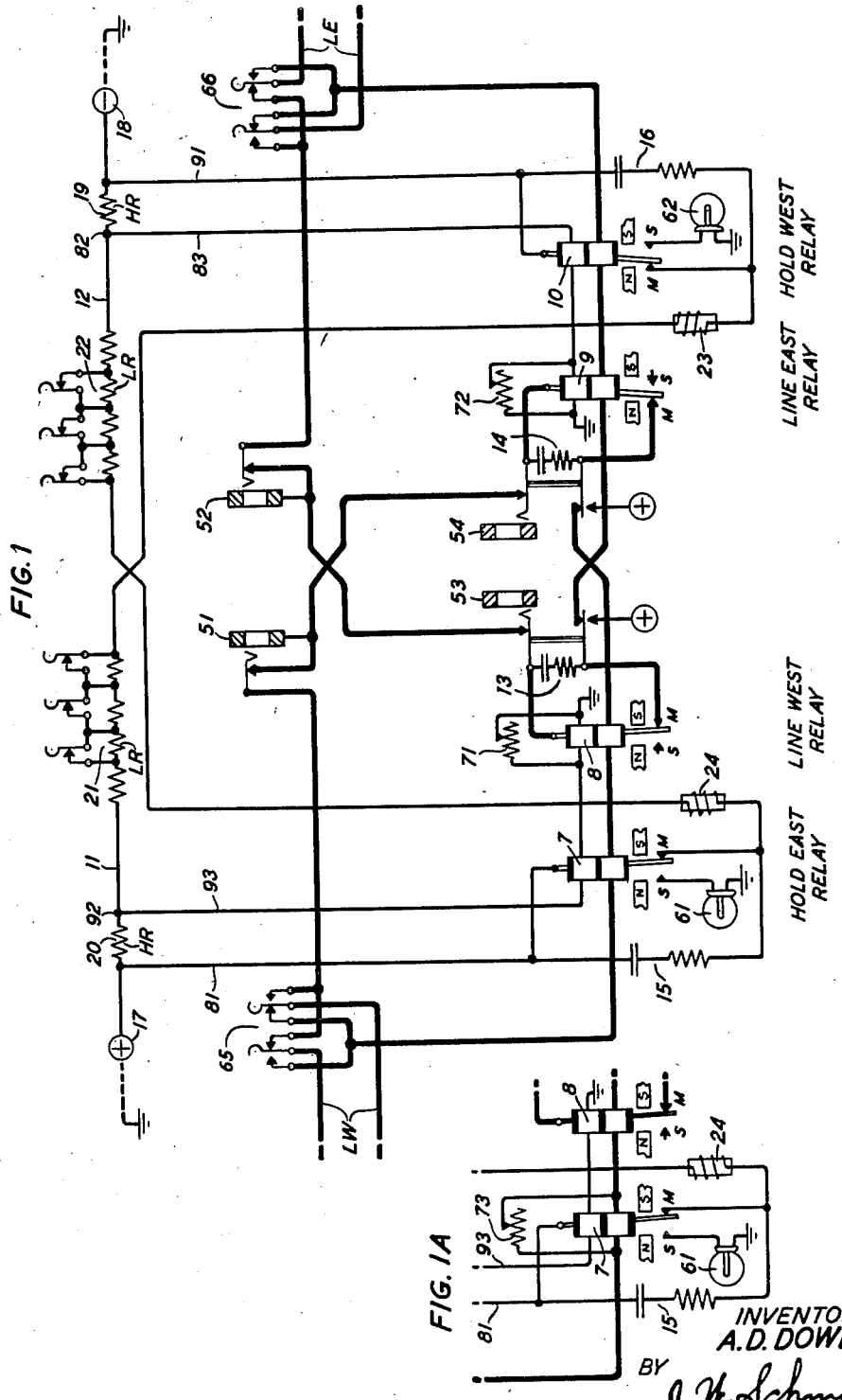

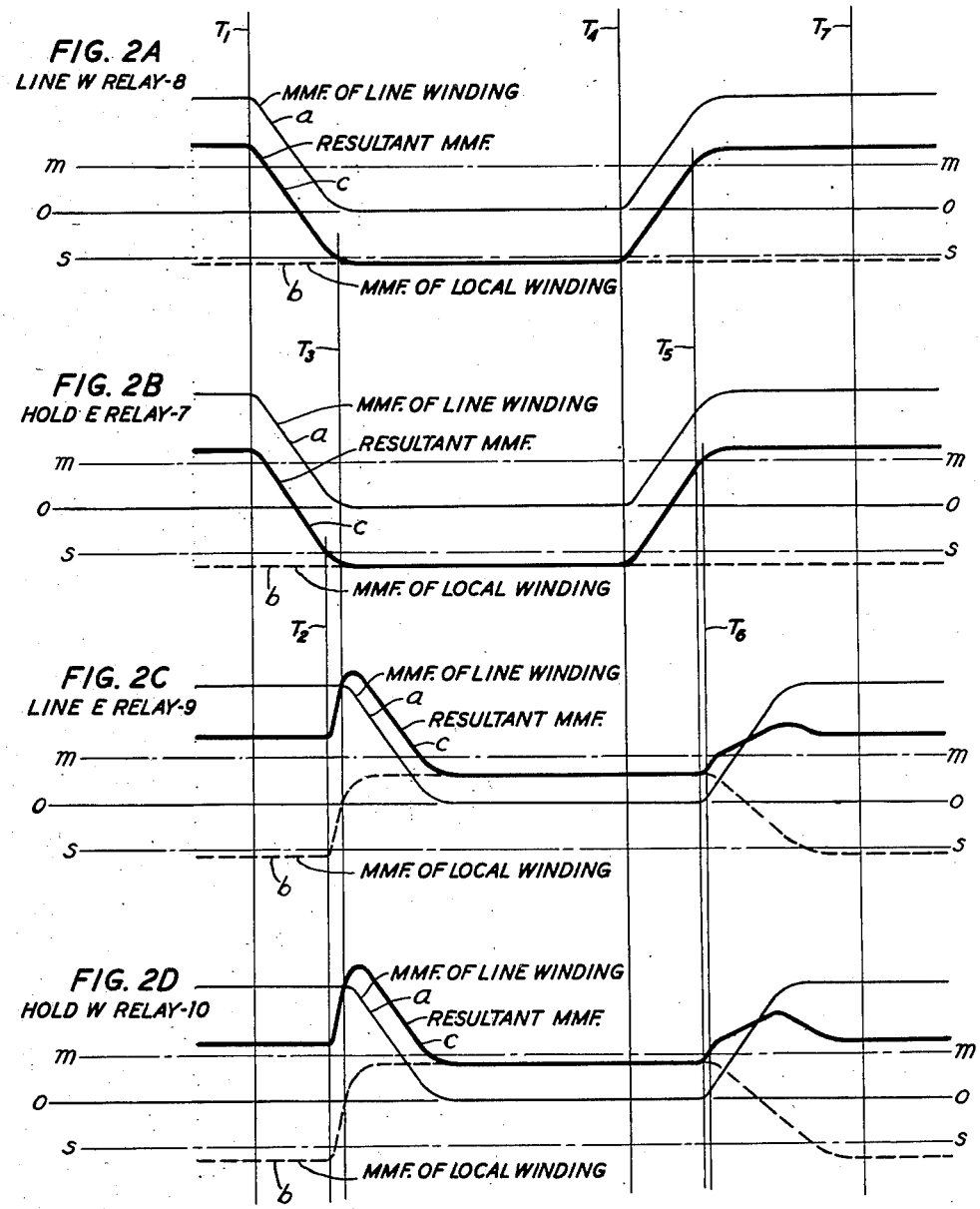

1,979,026

UNITED STATES PATENT OFFICE 1,979,026

TELEGRAPH SYSTEM

Andrew D. Dowd, Montclair, N. J., assignor to Bell Telephone Laboratories, Incorporated, New York, N. Y., a corporation of New York Application March 11, 1932, Serial No. 598,209

14 Claims. (Cl. 178—71)

This invention relates to telegraph systems and more particularly to systems of this kind in which polarized relays are used for repeating or retransmitting the telegraph signals.

The invention is applicable to telegraph repeaters for any of the usual services, as for repeating signals between two line sections or for retransmission of signals between an extension line or loop circuit and a line section. The invention is particularly applicable to repeaters, generally known as simplex repeaters, for transmission in only one direction at a time and which usually comprise two sets of relays, one set for each direction of transmission, and one of which remains inactive while the other set is active in repeating the signals.

One of the principal objects of the invention is to secure a definite sequence of operation of the active relays in repeaters of this type in response to incoming signals in order to insure that the other set of relays remains unaffected by the signals.

Another object of the invention is the provision of simple and inexpensive means for securing sequential operation of the relays without interference with the rise and fall of the impulse current and without danger of regenerative action between the relays.

In simplex repeaters two sets of polar relays are utilized for repeating the signals, each set usually comprising two relays and being associated with its corresponding line section. The polar relays may each have two windings, namely a line winding which is included in the associated line circuit and a biasing winding which is included in a local or auxiliary circuit. Only one of the sets of relays, namely the set associated with the incoming line, performs the repeating action and it is essential that the other set of relays, during this action, remain unaffected by the repeated signals even though the line circuit through the line windings be continually opened and closed by the active relays, so that there shall be no interfering action between the two sets of relays and no mutilation of the signals.

For disclosures of telegraph repeaters of this type, to which the invention may be applied, reference may be had to United States Patent 1,601,799, issued October 5, 1926 to J. Herman and Patent 1,804,547, issued May 12, 1931 to R. B. Shanck. In the repeaters shown in these patents, means are provided for securing the proper relation between the rates of building-up and dying-down of the current in the line windings and the current in the biasing windings of the inactive relays in response to the operation of the active relays to insure that only the active relays be affected by the signals.

An additional margin of safety may be obtained for holding inoperated the inactive relay set at high signaling speeds by a sequential operation of the polar relays in the active relay set. Even though the two polar relays in the active set may be of identical design and jointly controlled from the same source, by mechanically biasing either one of them it is possible to obtain a certain sequence of operation of the two relays upon an opening of the associated line circuit and to obtain the inverse sequence of operation upon a closure of the line circuit. This sequence of operation of the active relays is taken advantage of to insure that a holding circuit is provided for the auxiliary or biasing windings of the inactive relay set during the total time when the circuit through the line windings of the inactive relays is being held open by the active relay set. However, such a mechanical bias of polarized relays has the disadvantage of reducing the efficiency of their operation.

In accordance with the invention, the double sequential operation of the two relays of a set may be obtained in different ways by adjustment of the biasing magnetic flux in one or both relays. Thus the relay, which controls the holding circuit for the inactive relays, may have its magnetic bias toward the spacing contact slightly reduced. This reduction may be accomplished either by reducing the number of turns in the winding or by diverting a small part of the current from the winding as for example by a resistance by-path for the winding. Another way would be to increase the magnetic bias towards the spacing contact of the relay which controls the line circuit through the inactive relays, which may be accomplished by reducing the ampere turns of the line winding as, for example, by diverting a small part of the line current over a resistance by-path. It is still possible to take advantage of both of these methods by applying the first mentioned method to one and the second method to the other relay of the set, the effect being additive both in the case of an opening and of a closing of the line circuit.

The invention will now be described more in detail and reference will be made to the accompanying drawings in which:

Fig. 1 is a circuit diagram of a repeater station equipped in accordance with the invention;

Fig. 1A is a diagram showing a modification for part of the circuit shown in Fig. 1; and Figs. 2A, B, C and D are graphic representations of the variations in magnetomotive forces in the active and the inactive relays of the repeater station, shown in Fig. 1, in response to an incoming impulse.

Referring now to Fig. 1, the repeater station comprises two polarized relays 7 and 8 associated with line west LW and two polarized relays 9 and 10 associated with the line east LE. These relays are of the high speed type and each have one winding, the lower winding in the drawings, included in its related line circuit, and an auxiliary or biasing winding, the upper winding, connected in a local circuit. With the line circuit closed the line winding overcomes the auxiliary winding and holds the armature on the marking contact $m$, whereas when the line is open the auxiliary winding, the ampere turns of which are about one-half of those of the line winding, holds the armature against the spacing contact $s$.

A number of jacks 51, 52, 53 and 54 are provided for insertion of patching cords to the monitoring equipment (not shown) in order to facilitate testing of lines and relays. Reversing keys 65 and 66 are included in the line circuits to insure proper polarization with respect to the distant stations.

A local circuit is provided which includes a source of current of any convenient type having its middle-point grounded. The local circuit is connected between the positive terminal 17 and the negative terminal 18 of this source. The principal object of this local circuit is to supply biasing current to the polarized relays 7, 8, 9 and 10. Thus a circuit may be traced from positive terminal 17, conductor 81, armature and marking contact of relay 7, inductance 24, biasing resistance 22, conductor 12, high resistance 19 to negative terminal 18. The resistances 24 and 22, included in this circuit, are small compared with the high resistance 19 for which reason the point 82 will have a positive potential, and current may be traced from this point over conductor 83 through the biasing windings in series of relays 10 and 9 to ground. The effect of the biasing windings due to this current is to exert a force on the armature towards the spacing contacts. A similar biasing circuit may be traced from the negative terminal 18, conductor 91, armature and marking contact of relay 10, inductance 23, low resistance 21, conductor 11, high resistance 20 to positive terminal 17. The high resistance 20 in this path is high enough to provide a negative potential at point 92 so that a current will flow to this point over conductor 93 and through the biasing windings in series of relays 7 and 8 from ground, providing a biasing effect of the armatures also of these relays towards the spacing contacts.

The proper biasing current under varying line conditions may be secured by adjustment of resistances 21 and 22, respectively, for the two sets of relays. Spark killers 15 and 16, each comprising a condenser and a resistance, are bridged across the contacts of relays 7 and 10. Indicator lamps 61 and 62 serve to give a visible indication of the operations of relays 7 and 10.

The effect of spark killer 15 and inductance 24 upon the rise and decay of the biasing current through the auxiliary windings of relays 9 and 10, when relay 7 is operated between its contacts, is fully described and illustrated in the Patent 1,804,547 to Shanck, referred to above, and reference is made to that patent for an understanding of this feature of the circuit arrangement. The spark killer 16 and inductance 23 similarly influence the biasing current through the auxiliary windings of relays 7 and 8 when relay 10 is operated from one contact to the other.

The line current over the line west will flow over the following path, beginning with the lower conductor of the line LW, closed contact of key 65, line windings in series of relays 7 and 8, contacts of jack 54, marking contact and armature of relay 9, contacts of jacks 54 and 51, closed contact of key 65 to the upper line conductor of line LW. A similar circuit may be traced for the current in the line LE, beginning at the lower conductor, closed contacts of key 66, line windings in series of relays 10 and 9, contact of jack 53, marking contact and armature of relay 8, contacts of jacks 53 and 52, closed contact of key 66 to the upper conductor of line LE. Spark killers 13 and 14 are connected across the marking contacts of relays 8 and 9, respectively. Currents normally flowing in these circuits cause the line windings of the relays to force the respective armatures against their marking contacts with a magnetomotive force which is approximately twice that of the biasing windings.

For the purpose of explaining the operation of this system, the circuit will be assumed to normally be in the condition illustrated in the drawings in which case line current is assumed to flow in both line circuits.

Assuming now that the line west is temporarily opened, the current through the line windings of relays 7 and 8 is reduced to zero and both armatures operate to spacing position. When the marking contact of relay 7 opens, the positive potential from terminal 17 is removed from the point 82 which now becomes negative, so that the current through the biasing windings of relays 9 and 10 reverses, causing these windings to aid the line windings. When the marking contact of relay 8 opens, the line current through relays 9 and 10 is reduced to zero and the line east is opened to correspond to the condition in line west. Due to the arrangement of spark killer 15 and inductance 24, the current in the biasing windings of relays 9 and 10 is caused to reverse quickly and thus to become effective in holding the armatures of these relays against the marking contacts before the current in the line windings of these relays reaches zero.

In order that this circuit may meet increased requirements for higher speed of signaling, a resistance 71 is provided in accordance with the invention to form a shunt path for the biasing winding of relay 8, whereby a small fraction of the current is diverted from the winding, the purpose being to delay the operation of relay 8 with respect to that of relay 7, when the line LW is opened, and thus delay the opening of the circuit for the line windings of relays 9 and 10 with respect to the reversal of curent in the biasing windings of these relays and thereby further insure against these relays being affected by impulses in the line west.

When the line west is again closed at the end of the impulse the relays 7 and 8 operate to their marking contacts. When the armature of relay 8 reaches its marking contact, the line circuit east is again closed to correspond to the line condition on line west, and the line windings of relays 9 and 10 will hold their armatures against the marking contacts. When the armature of relay 7 reaches its marking contact positive potential is again applied to point 82 and the current in the biasing windings of relays 9 and 10 is reversed to influence the armatures towards the spacing contacts. The effect of spark killer 15 and inductance 24 now is to delay the reversal of current in the biasing windings of relays 9 and 10 with respect to the rise of current in the line windings of these relays, thereby insuring against operation of the armatures when the line west is closed.

The resistance 71 also in this case provides a further safeguard in this respect, since it causes the relay 8 to operate to marking before relay 7, whenever the line LW is being closed and thus advances the rise of current in the line windings of relays 9 and 10 with respect to the reversal of the current in the biasing windings of these relays.

A similar series of operations will take place when the line east is opened and closed and relays 9 and 10 are active in repeating impulses over the line west. The resistance 72 bridged across the biasing winding of relay 9, similarly as resistance 71, aids the spark killer 16 and inductance 23 in securing against operation of the inactive relays 7 and 8 under this condition.

The effect of the resistance by-path for the biasing winding of relay 8 will now be explained in connection with an impulse on the line LW and reference will be made to the graphic presentations in Figs. 2A to D.

As indicated in the drawings each of these figures pertains to one of the relays 8, 7, 9 and 10, respectively, and each figure shows the graphs $a$, $b$, and $c$, of which $a$ represents the variations in the magnetomotive force of the line winding as the line current is reduced from normal to zero and again increased to normal, $b$ represents the magnetomotive force of the local or biasing winding, and $c$ represents the resultant of the magnetomotive forces of the line winding and the local winding and is the algebraic sum of the graph $a$ and $b$.

In these figures the line $o, o$ represents zero magnetomotive force, and line $m, m$ represents the magnetomotive force necessary to operate the armature to marking and line $s, s$ the magnetomotive force necessary to operate the armature to spacing.

Before the time $T_1$ and after the time $T_7$, indicated by lines common to all figures, the normal line current through the line windings of any one of the relays produces the magnetomotive force illustrated by curve $a$, which is approximately twice that of the local windings illustrated by the curve $b$; it will be observed, however, that whereas for relays 7 and 10 the biasing magnetomotive force may be exactly equal to half of that of the line winding, for relays 8 and 9, the biasing magnetomotive force is less than one-half of that of the line winding, due to the presence of resistances 71 and 72, but it is still somewhat greater than that required for operating the armature to spacing.

When, at the time $T_1$, the line west is opened it is evident that the resultant magnetomotive force $c$ of relay 7 will sooner reverse and cause the operation to spacing of the armature than will the resultant magnetomotive force of relay 8, since the biasing force of relay 7 is greater than that of relay 8; thus relay 7 operates to spacing at the time $T_2$ and relay 8 operates slightly later, at time $T_3$.

At the time $T_2$ the opening of the marking contact of relay 7 causes the reversal of the biasing current in relays 9 and 10, as shown in Figs. 2C and D; due to the spark killer circuits this reversal takes place very quickly, as indicated by curves $b$. At the time $T_3$, when the marking contact of relay 8 opens, the line current through relays 9 and 10 decays, as shown by curves $a$, and the resultant magnetomotive force, as shown by curve $c$, remains in a direction to hold the relay against its marking contact.

At the time $T_4$, when the line west is again closed, the resultant magnetomotive force $c$ in relay 8 causes the operation of the armature to marking at the time $T_5$, whereas due to the stronger biasing flux, the resultant magnetomotive force $c$ of relay 7 does not increase sufficiently to operate the armature to marking until a short time later, namely, at the time $T_6$.

At the time $T_5$ relay 8 closes the line east and the magnetomotive force of the line windings of relays 9 and 10, as shown in Figs. 2C and D, begins to rise. At the time $T_6$, when the marking contact of relay 7 is closed, the biasing current through windings 9 and 10 begins to decrease and then reverses. Due to the inductance 24, the biasing flux decreases and reverses slowly, as indicated by curves $b$, and the resultant flux in relays 9 and 10, as shown by curves $c$, remains in a direction to hold the armatures of these relays against their marking contacts. At the time $T_7$, the condition for both lines closed is restored.

The resistances 71 and 72 are high as compared with those of their associated biasing windings; they should be of the order of 5 to 10 times the resistance of the winding.

The same effect as secured by resistance 71 may be secured by connecting a similar resistance 73 as a by-path to the line winding of relay 7, as shown in Fig. 1A. In this case the biasing current would be the same for both relays 7 and 8 and relay 7, having the weaker line current, would operate its armature sooner than would relay 8 when the line LW is opened, and later than would relay 8 when the line is closed again, just as in the case described above. It is, furthermore, evident that a pair of resistances connected as the resistances 71 and 73 may be used in each side of the repeater circuit to further secure the proper inverse sequences of operation at high speed to prevent mutilation of the repeated signals.

It should be understood that the invention is not applicable only to the system illustrated and described, but may be used in other systems in which sequential operation is desired; nor is it necessarily a limitation that the relays must be sequentially operated by the exact arrangement described, it being not necessary, for example, that their corresponding windings be operated in a series circuit, the main requirement being that the opposing magnetomotive forces be so adjusted that the armatures will operate in the proper sequences.

What is claimed is:

1. A signaling system comprising a line circuit connected to a source of signaling current, a pair of biased electromagnetic devices of like operating characteristics, each having a line winding connected in said line circuit, a movable element and means for producing a biasing flux in said element opposed to the main flux produced by the signaling current in said line winding, and means for adjusting the resultant of said fluxes in the element of at least one of said devices to secure sequential operation of said elements in inverse order for decreasing and increasing current in said line windings.

2. A signaling system in accordance with claim 1 in which said flux adjusting means comprises means for controlling the biasing magnetizing force of said one device.

3. A signaling system in accordance with claim 1 in which said flux adjusting means comprises means for controlling the magnetizing force of the line winding of said device.

4. A signaling system in accordance with claim 1 in which said flux adjusting means comprises circuit means having resistance for slightly reducing the signal current in the line winding of said one device.

5. A signaling system in accordance with claim 1 in which said windings of said two devices are series connected and said flux adjusting means comprises a high resistance by-pass for one of said windings.

6. A signaling system comprising a line circuit, a pair of polarized signal receiving devices of the same operating speed, each having a line winding connected to said line circuit, an auxiliary winding connected to a local source of direct current and an armature and a contact for circuit control in response to incoming signals, said line winding and auxiliary winding producing in said armature opposed magnetic fluxes, the resultant of which is capable of operating said armature in opposite directions in accordance with incoming signals, and means for adjusting the resultant flux in the armature of one of said devices with respect to that in the other armature to cause sequential operation of said armatures in response to a decreasing line current and to cause the inverse sequence of operation in response to an increasing line current.

7. A signaling system in accordance with claim 6 in which said flux adjusting means comprises means for adjusting the magnetomotive force of one of the windings of said one device.

8. A signaling system in accordance with claim 6 in which said flux adjusting means comprise adjustable circuit means connected to the auxiliary winding of one of said devices for reducing its magnetomotive force slightly below that which would cause simultaneous operation of said devices on variations in line current through the line windings.

9. A high speed signaling system comprising a line circuit, a local source of direct current, a pair of polarized signal receiving relays of like operating speeds, line windings on said relays connected to said line circuit, biasing windings on said relays connected to said local source, means for slightly reducing the flux in one relay due to the line winding and means for slightly reducing the flux in the other relay due to the biasing winding, the reductions in the fluxes being from such flux densities as would cause simultaneous operation of said two relays in response to increasing or decreasing current through said line windings.

10. A high speed signaling system in accordance with claim 9 in which said flux reducing means comprises a resistance by-pass for the line winding of said one relay and a resistance by-pass for the biasing winding of said other relay.

11. In a high speed telegraph repeater system, an incoming line section, an outgoing line section, a pair of like relays for repeating signals from said incoming line section into said outgoing line section, each of said relays having differential windings and reversing contacts, means for introducing a time lag between the contact reversal of one of said relays and that of the other of said relays upon an opening of said incoming line section and for inverting the sequence of contact reversals upon a closure of said incoming line section, said means comprising a high resistance element connected in circuit with a winding of one of said relays for slightly changing the resultant flux in said one relay.

12. A high speed telegraph repeater system comprising a line section, a polar line relay having a line winding and a biasing winding, an auxiliary polar relay having a line winding and a biasing winding, a line circuit connected to said line section and including said line windings in series for operation in one direction of said relays, a biasing circuit connected to a local source and including said biasing windings in series for operation in the other direction of said relays, and a high resistance by-pass for the biasing winding of said auxiliary relay for sequential operation of said relays at decreasing line current and for the inverse sequential operation at increasing line current.

13. In a telegraph repeater system in accordance with claim 12, a second comparatively high resistance by-path for the line winding of said line relay for aiding the first mentioned by-pass in effecting sequential operation of said relays.

14. A high speed telegraph repeater station, an incoming line and an outgoing line, said station comprising a pair of active polarized relays for repeating signals from said incoming line into said outgoing line, a pair of inactive relays for repeating signals from said outgoing line into said incoming line upon reversal of the direction of transmission in said lines, each of said relays having a line winding and a biasing winding, a local circuit connected to the contacts of one of said active relays for control of a holding circuit for the biasing windings of said inactive relays, contacts on the other of said active relays for controlling the outgoing line circuit through the line windings of said inactive relays, circuit means associated with said local circuit for extending the holding time of the biasing winding in said inactive relays beyond the time of open-circuit through the line windings of said inactive relays due to the operation of said other active relay and resistance means connected to a winding of said active relays to cause sequential operation of said active relays in inverse order for decreasing and increasing current respectively in said incoming line to further extend said holding time beyond said time of open-circuit to insure that said inactive relays remain uneffected by signals incoming to said active relays at high speed signaling.

ANDREW D. DOWD.